United States Patent Office 2,955,932
Patented Oct. 11, 1960

2,955,932
HYDROMETALLURGICAL PROCESS

Mayer B. Goren, Denver, Colo., assignor to Kerr-McGee Oil Industries, Inc., a corporation of Delaware
No Drawing. Filed Apr. 22, 1957, Ser. No. 654,080
20 Claims. (Cl. 75—121)

This invention relates to improvements in hydrometallurgical processes and more particularly to emulsion inhibition in hydrometallurgical solvent extraction processes wherein an aqueous solution containing metal values to be concentrated by solvent extraction also contains troublesome slimes.

Research efforts in hydrometallurgy have resulted in the development of an impressive variety of solvent extraction processes designed to extract metals selectively from leach liquors into a water immiscible organic selective solvent from which the metal may subsequently be recovered by various stripping agents. Other solvent extraction processes are designed to extract anion complexes with very high selectivity from their aqueous solutions for the purpose of securing very high grade concentrates or products. The water immiscible organic selective solvents may be acidic in nature such as the mono- or di-alkyl hydrogen phosphates, or neutral in nature, such as the tri-alkyl phosphates, or basic in nature, such as the more recently developed organic amine selective solvent extractants. The present invention is concerned only with those water immiscible organic selective solvents which are either neutral or basic in nature and not with those which are acidic in nature. The organic selective solvents which are acidic in nature are not suitable for use in accordance with the present invention.

There are comparatively few water immiscible organic selective solvents which may be classified as neutral in nature, such as tri-butyl phosphate or other tri-alkyl phosphates, diethyl ether, hexane, and cetrain esters and ketones. However, a wide variety of amines have activity in organic solvent extraction processes and are well known to the art. In general, the more satisfactory amine selective solvents are relatively high molecular weight and primary, secondary or tertiary alkyl amines (mono, di or tri-alkyl amines) which are insoluble in dilute acidic solutions. The lower alkylated amines are, in general, soluble in dilute acid solutions and are not useful in solvent extraction processes, as is well understood in the art. Generally, as the size of the alkyl substituent increases, the corresponding amine salts become less and less soluble in water or dilute acid solutions and more soluble in organic solvents. Examples of suitable amines which have been found to be useful to various extents as organic selective solvent and which are very satisfactory in practicing the present invention are illustrated below in Table I. The amines illustrated therein are chosen at random and are intended as being only representative of a very large group of active amines.

TABLE I

| Amine | Formula |
| --- | --- |
| Tri iso octyl amine | $(C_8H_{17})_3N$. |
| Dodecenyl dibutylamine | $C_{12}H_{23}$—$N(C_4H_9)_2$. |
| Didodecenyl n butylamine | $(C_{12}H_{23})_2N$—$C_4H_9$. |
| Bis-(1-isobutyl-3,5 dimethylhexyl) amine | $(C_{12}H_{25})_2N$—H. |
| N-dodecenyl alkylamine | $C_{12}H_{23}$—NH—R (R is a highly branched 9–12 carbon alkyl group). |
| Armeen 2-12 | $(C_{12}H_{25})_2NH$. |
| Tri-n-octyl amine | $(C_8H_{17})_3N$. |

The chemistry of amine extraction processes is thought to be largely similar to the chemistry of ion exchange absorption of metals from their aqueous solutions by anion exchange resins; i.e., the metal is most probably complexed by the liquid or solid amine as a simple or complex anion. In the more successful solvent extraction processes, the amine-anion complex is selectively soluble in the organic phase, the amine solvent normally being dissolved in a water immiscible inert organic solvent such as kerosene, naphtha, benzene, chloroform, etc. In practicing a conventional solvent extraction process, the solution of amine in organic solvent is intimately contacted with an aqueous leach liquor containing metal values to be concentrated, thereby forming the amine-metal anion complex. Successive contacts with fresh amine in organic solvent serves to transfer essentially the entire content of metal values to be concentrated from the aqueous leach liquor into the organic phase to thereby provide a metal loaded extraction solution. This extraction solution then may be stripped with any suitable stripping agent to provide a concentrate of the extracted metal values in the stripping solution and a regenerated amine in water immiscible inert organic solvent. The resulting strip solution is then further processed in accordance with prior art processes to produce a concentrate of the metal values or a metal containing product which, in turn, may be further processed to the desired metal. The regenerated amine in water immiscible inert organic solvent may then be recycled in the process.

One serious problem encountered in liquid-liquid extraction processes of the type above described is emulsion formation, which often gives rise to expensive losses of the selective organic solvent in instances where the organic phase, i.e., the solution of organic selective solvent in water immiscible inert organic solvent, is emulsified into the barren aqueous phase. Also, in instances where the aqueous phase, i.e., the leach liquor, is trapped in the organic phase, the impurities contained therein are removed with the organic phase and subsequently stripped therefrom during the stripping step. The resulting strip solution contains undesirable amounts of impurities which in turn are present in the metal concentrate or product finally prepared therefrom.

In general, the proper choice of organic selective solvent and the water immiscible inert organic solvent will minimize emulsion difficulties in solvent extraction operations dealing with wholly clarified sparkling liquors. For example, proper selection of substituent alkyl groups on amine organic selective solvents will minimize the surface-active properties of the molecule so that emulsion formation is largely eliminated. However, when the aqueous leach liquors being treated are turbid, as frequently arises in hydrometallurgical practice, emulsion difficulties become multiplied many times and particularly in the instance of the amine extractants.

Turbidity in slightly dirty leach liquors is rarely attributable to the so-called sand fraction of the pulp, and is generally due to fractions of the finer, clayey slime portion. The slime portion contains microscopic particles which resist settling in a thickener, or which may pass through a clarifying filter. Such particles are highly hydrated suspended clay fractions of large surface area and exhibit the usual ion exchange characteristics of clays. It is this property which most likely gives rise to the vicious emulsification tendencies of the above mentioned turbid liquors when contacted with the amine-in-organic solvent and to lesser extent with other types of selective solvents. When such highly hydrated suspended clay fractions are contacted with an organic solution of an amine, the latter may be strongly absorbed on the surface of the clay particles, with the hydrocarbon chain of the molecule being oriented outward to thereby expose a hydrophobic surface. As a consequence, the clay-amine complex is wet by the organic layer and is carried into the organic phase along with considerable amounts of aqueous phase which is trapped by the hydrated clay particles. The presence of such solids in the organic phase appears to promote the carrying of the raffinate into the organic phase and thus serves to stabilize the emulsion. In consequence, there is no clean break between the aqueous phase and the organic phase, and separation between the two phases is difficult and loss of solvent to the aqueous phase occurs. In addition, the amine which is absorbed on the clay particles is lost.

It is an object of the present invention to suppress the deleterious effects of slimes in solvent extraction processes.

It is a further object of the present invention to provide a novel process for treating slimes contained in leach liquors whereby the tendency of the slimes to promote emulsification of the organic layer in a solvent extraction process is inhibited.

It is still a further object of the present invention to provide a process wherein emulsion formation stabilized by solids present in a turbid leach liquor is prevented.

It is still a further object of the present invention to provide a novel process to prevent adsorption of organic selective solvents on the ion exchange sites of suspended solid particles contained in a turbid leach liquor.

It is still a further object of the present invention to provide a novel process for preventing the carrying of solids, together with occluded raffinate, from a turbid leach liquor into the organic extract phase during a solvent extraction process.

It has been discovered that if leach liquors containing suspended solids are treated with any one or a combination of a number of organic reagents, i.e., poly cationic materials, preferably prior to contacting with a suitable organic selective solvent in water immiscible inert organic solvent, adsorption of the selective solvent on the surface of the slime particles can be prevented. Thus, the solids or slimes are not carried into the organic layer and the formation of a solid-stabilized emulsion is prevented.

The reagents which have been found to be most effective in practicing the present invention have the following general characteristics:

(1) The reagent must be strongly adsorbed by the solids or slimes in the leach liquor, largely saturating the ion exchange sites, and should not be desorbed and replaced by the selective solvent during the subsequent solvent extraction step.

(2) The reagent must be hydrophilic in nature and, after adsorption on the surfaces of the solids or slimes, form a hydrophilic exterior surface oriented toward the liquid-liquid system, thereby repelling the organic phase and being strongly wet by the aqueous phase.

(3) If the reagent is used in excess beyond the adsorptive capacity of the suspended solids or slimes, the reagent should not possess sufficient surface-active properties to promote emulsification.

(4) The reagent should be soluble in the presence of various anions and cations in the aqueous leach liquor, although certain reagents of somewhat limited solubility are effective due to the relatively small dosage required.

(5) The reagent should not react with the selective organic solvent.

(6) Preferably, the reagent should be effective at low dosages and, from an economic standpoint, the reagent should be low in price.

In accordance with the present invention, turbid leach liquors containing suspended solids or slimes are first treated with one or a combination of a variety of water or acid soluble poly cationic materials such as polymeric amines and quaternary ammonium compounds having a molecular weight of at least about 5,000 and higher (e.g., to the degree of polymerization which affords a product having characteristics bordering on insolubility in dilute acid solutions containing multivalent anions such as sulfate, and which will therefore vary for individual polymers) and then subsequently contacted with a suitable extractant for the metal to be concentrated such as a solution of tri-butyl phosphate or a suitable amine in kerosene. The foregoing treatment will afford suspensions wherein little or no solids are occluded and emulsified into the organic layer and a clean separation between the two liquid phases may be readily achieved. Also, the solids do not tend to collect at the interface of the two phases, but instead are either uniformly dispersed and/or settle in the aqueous phase. As above stated, it is generally preferable to treat the turbid leach liquor prior to the extraction step for best results but this is not always necessary. For example, in some instances, satisfactory results may be obtained by treatment with the reagent during or following the extraction step.

Among the polymeric amines and polymeric quaternary ammonium compounds which have been found to be very effective are water or acid soluble polyethylene imine, poly 4-vinyl pyridine, poly 2-vinyl pyridine, poly 2-methyl 5-vinyl pyridine, poly 2-vinyl quinoline, poly dimethylamino ethyl acrylate, poly dimethyl amino ethyl methacrylate, poly diethylamino ethyl acrylate, poly diethylamino ethyl methacrylate and poly vinylpyridine metho-p-toluene sulfonate. All of these materials may be classified as poly-cationic reagents having satisfactory hydrophilic properties.

Polymeric amines and polymeric quaternary ammonium compounds which have not been found useful in practicing the present invention, and which show either no activity or else enhance emulsion stability, are exemplified by the Hofmann degradation products of poly acrylamide, such as are described in U.S. Patent No. 2,729,560 to House et al., and by alkylated poly vinyl pyridines wherein the alkyl group contains more than about 2 carbon atoms. Thus, poly 4-vinyl-N-n-butyl pyridonium bromide such as described by Fuoss and Strauss (Annals of the New York Academy of Sciences, 51, 836–851, May 1949) promotes the wetting of solids by the organic phase to such an extent that all of the solids are transferred to the organic phase. In this instance, the N-butyl group is of sufficient hydrophobicity so that when exposed to the liquid-liquid environment, wetting by the organic phase is favored over wetting by the aqueous phase. This reversal of characteristics is believed to be attributable to the fact that the substituent alkyl group is wholly nonpolar and large enough, when oriented toward the exterior liquid phases, to promote wetting by the organic phase. However, certain modifications allow incorporation without deleterious effects of substituents having an equal or greater number of carbon atoms, provided that polar hydrophilic functions are introduced at the same time to counterbalance the hydrophobic influence of the hydrocarbon substituent.

Thus, poly vinyl pyridine may be quaternized with ethylene chlorohydrin and the resultant hydroxyethyl ammonium quaternary reacted with a molar equivalent of ethylene oxide to give a product of the structure:

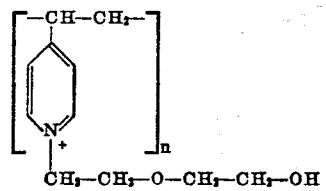

The poly ethylene oxide quaternary function on the pyridine nitrogen now introduces sufficient hydrophilic character to the molecule to overbalance the hydrophobic properties of the introduced carbon atoms, and the resulting product is operative in practicing the present invention. It is apparent that a wide variety of polycationic materials may be made to function for the purposes of the invention if a proper degree of hydrophilic character is achieved. This may be readily determined for any desired substance by a very simple test. For example, the resulting molecule has a proper degree of hydrophilic character and is operative in practicing the invention if treatment of a dilute (0.5% or less) aqueous bentonite slurry with a sufficient quantity of the material to be tested, followed by subsequent vigorous agitation of the slurry with a volume of hexane equal to about one-tenth the volume of the slurry to be tested, results in little or no transfer of solids to the hexane phase. If, on the other hand, solids are transferred in significant amounts to the hexane phase, then the tested product does not exhibit a proper degree of hydrophilic character and therefore is not operative in accordance with the process of the present invention. Where the polycationic materials or reagents described herein for the treatment of turbid leach liquors are referred to in the claims as being "of hydrophilic character," it is understood that the polycationic material or reagent has a proper degree of hydrophilic character as determined by the above described test. The Hofmann degradation products of poly acrylamide are apparently inoperative due to their carboxylic acid content which arises from inadvertent hydrolysis of the amide groups. As a result, these materials have very limited solubility in acid solutions, and in neutral solutions they react with the amine extractant to form insoluble poly soaps.

The efficiency of the polymeric amines and polymeric quaternary ammonium compounds described herein varies from one species to another and is affected to some extent by such variables as the degree of polymerization (molecular weight), and effective hydrophilic properties of the polymer. The hydrophilic properties may also vary with molecular weight, equivalent weight of the monomer unit, and other factors. The dosage required per unit of weight of solids suspended in the aqueous leach liquor will also vary depending upon the types of clays which are present in the slimes, since the ion exchange properties of the solids will vary from one clay to the next. It is, therefore, impractical to attempt to fix a definite lower limit of dosage. However, it may be stated that effective dosage in amine extraction systems generally involves application of about 0.1% by weight of polymer based on the total solids content of the aqueous leach liquor for the most active polymers, such as a high molecular weight poly 2-methyl 5-vinyl pyridine; up to as high as 4–5% by weight of polymer based on total solids content of the aqueous leach liquor for some relatively inactive polymers, such as excessively high molecular weight poly ethylene imine samples which are of such a degree of polymerization that the polymer exhibits only very limited solubility in the presence of multivalent anions such as sulphate.

The upper limit of dosage is dictated by economics, since there appears to be no upper dosage limit in terms of efficiency of emulsion inhibition. For example, a tenfold excess of the slime suppressing reagents described herein over the minimum required dosage which effects clean separation between the two liquid phases does not have any deleterious effect on emulsion inhibition. A factor which does set an upper limit on dosage is that some of the polymeric amines or poly quaternary ammonium compounds, particularly those of higher molecular weight, when used in excess will react with and precipitate a variety of metals which may be present in solution as anions or anionic complexes. In certain acid solutions, such anions or anionic complexes may be exemplified by molybdate, vanadate and chromate. In instances where such anions or anionic complexes are to be extracted, it is necessary that the dosage be regulated to give the desired phase separation without incurring loss of product through precipitation by the slime suppressing reagent.

An easily controlled variable which plays an important role in the above mentioned phenomenon of irreversible precipitation of anions and anionic complexes by the polycationic material used as a slime suppressing reagent is that of increasing the intrinsic hydrophilic character and thereby the water solubility of the polycationic material, and of its anionic complexes, by introduction of water solubulizing groups along the polymer chain. This may be accomplished by either copolymerizing the cationic monomer with polar hydrophilic monomers or by introduction of such groups into the preformed homo polymer. Thus, a monomeric polymerizable amine may be copolymerized with such polar vinyl monomers as vinyl acetate (with subsequent hydrolysis to vinyl alcohol), vinyl methyl ether, acrylamide, simple N-alkyl acrylamides, N-vinyl pyrrolidone, methyl acrylate or methyl vinyl ketone; or a preformed polymer may be alkylated or quaternized with ethylene oxide or ethylene chlorohydrin to introduce water solubilizing groups such as the hydroxy ethyl group, as hereinbefore described. The resulting products may be classified as polycationic substances with improved hydrophilic and water solubility properties.

The minimum dosage is much less for identical turbid liquors to be contacted during the metal extraction step with tributyl phosphate in an organic solvent that when the organic selective solvent is a suitable amine. Thus, a given polymer effective at a given dosage in an amine extraction system will, in general, be equally effective at as little as one-fifth of this dosage when tributyl phosphate is the selective solvent.

Although individual polymers or a combination of polymers described herein are effective on slime pulps containing as high as 10–15% solids in suspension, treatment is more economical when applied to what may be classed as "turbid" liquors containing less than 1% and preferably as little as 0.1% or less of suspended solids. Hazy thickener overflow liquors which can be very troublesome to treat by solvent extraction processes fall into this category and respond very well to economic treatment without the need of polishing filters, the effluent from which may still be hazy and contain sufficient suspended solids to be troublesome.

Inasmuch as the solvent extraction step generally involves vigorous, intimate mixing of the aqueous and organic phases, the flocs of solids formed in the pretreatment step with the reagents described herein will be degraded and thus expose fresh surfaces of slimes to the system. In view of this, for best results during treatment with the reagent, the turbid liquor should be violently agitated to break up the flocs so that all surfaces may be adequately treated with the reagent. When this practice is followed, fresh surfaces will not be exposed during the subsequent solvent extraction step due to the formation of fresh untreated surfaces of slimes and emulsion formation and/or transfer of solids to the organic phase may be effectively inhibited.

The foregoing detailed description and the following specific example are for the purposes of illustration only, and are not intended as limiting to the spirit or scope of the appended claims.

*Example 1*

A leach liquor obtained by acid leaching a typical molybdenum ore was treated and settled to provide a raw desanded pulp containing 9.7% solids. A portion of this pulp was filtered to afford a clear liquor to which varying amounts of pulp were added in order to prepare turbid liquors varying in solid content.

Aliquots of well-agitated samples were taken, treated with varying dosages of the slime treating agents and then intimately contacted with 25% by volume of an extractant comprising 90% kerosene and 10% of an active metal value extraction solvent such as tributyl phosphate or a suitable amine. The layers were vigorously agitated for five minutes and the separation behavior of the phases was observed.

Table II contains tabulated data illustrating the dosage of slime treating agent and the separation behavior for the respective solvent systems.

For the sake of simplicity, the slime treating agents are identified in Table II by the following Roman numerals:

I. Poly 2-vinyl pyridine metho-p-toluene sulfonate
II. Poly 2-methyl 5-vinyl pyridine (low degree polymerization)
III. Poly 2-methyl 5-vinyl pyridine (high degree polymerization)
IV. Polyethylene imine, molecular weight about 50,000
V. Poly 2-vinyl quinoline
VI. Poly 4-vinyl N-n-butyl pyridonium bromide
VII. Poly dimethylamino ethyl methacrylate
VIII. Poly 4-vinyl pyridine

TABLE II

| Test No. | Reagent | Dosage¹ | Behavior of Solvent System | |
|---|---|---|---|---|
| | | | Amine | Tributyl Phosphate |
| | | Percent | | |
| 1 | None | None | most solids to organic | most solids to organic. |
| 2 | I | 0.63 | emulsion; solids to organic. | trace emulsion. |
| 3 | I | 1.25 | clean separation | clean separation. |
| 4 | II | 0.5 | emulsion | Do. |
| 5 | II | 1 | do | Do. |
| 6 | II | 1.7 | clean separation | Do. |
| 7 | III | 0.07 | emulsion; solids to organic. | borderline—slight emulsion. |
| 8 | III | 0.10 | do | clean separation. |
| 9 | III | 0.16 | do | Do. |
| 10 | III | 0.21 | borderline—slight emulsion. | Do. |
| 11 | III | 0.32 | clean separation | Do. |
| 12 | III | 0.63 | do | Do. |
| 13 | III | 1.25 | do | Do. |
| 14 | IV | 1.25 | emulsion | borderline. |
| 15 | IV | 5 | borderline—slight emulsion. | clean separation. |
| 16 | V | 0.32 | emulsion | Do. |
| 17 | V | 0.9 | clean separation | Do. |
| 18 | VI | 0.5 | all solids to organic | emulsion. |
| 19 | VI | 1.0 | do | Do. |
| 20 | VI | 5 | do | Do. |
| 21 | VII | 0.8 | emulsion; solids to organic. | clean separation. |
| 22 | VII | 2.5 | clean separation | Do. |
| 23 | VIII | 0.32 | emulsion; solids to organic. | Do. |
| 24 | VIII | 0.63 | clean separation | Do. |
| 25 | VIII | 1.25 | do | Do. |

¹ Dosage: Percent by weight of polymer used in the treatment based on total weight of solids present.

What is claimed is:

1. In a process for the solvent extraction of metal values from their aqueous solutions wherein the aqueous solution is contacted during the solvent extraction step with a neutral to basic water immiscible organic solvent extractant for the metal values to thereby obtain a metal loaded extractant, the aqueous solution containing suspended slimes which detrimentally affect the extraction process, the improvement comprising treating the aqueous solution with effective quantities of a polycationic material of hydrophilic character having a molecular weight of at least 5,000 and less than that molecular weight represented by incipient insolubility in a dilute acid containing multivalent anions to render the slimes hydrophilic in nature and inhibit emulsion formation.

2. The process of claim 1 wherein the aqueous solution is treated with 0.1–5% by weight of polycationic material based upon the total weight of solids present in the aqueous solution.

3. The process of claim 1 wherein the aqueous solution is treated with the polycationic material prior to the extraction step.

4. The process of claim 3 wherein the treated aqueous solution is agitated to thereby reduce the size of the flocs produced therein.

5. The process of claim 4 wherein the aqueous solution is treated with 0.1–5% by weight of polycationic material based upon the total weight of solids present in the aqueous solution.

6. In a process for the solvent extraction of metal values from their aqueous solutions wherein the aqueous solution is contacted during the solvent extraction step with a neutral to basic organic water immiscible solvent extractant for the metal values to thereby obtain a metal loaded extractant, the aqueous solution containing suspended slimes which detrimentally affect the extraction process, the improvement comprising treating the aqueous solution with effective quantities of a polymeric amine of hydrophilic character having a molecular weight of at least 5,000 and less than that molecular weight represented by incipient insolubility in a dilute acid containing multivalent anions to render the slimes hydrophilic in nature and inhibit emulsion formation.

7. The process of claim 6 wherein the aqueous solution is treated with 0.1–5% by weight of polymeric amine based upon the total weight of solids present in the aqueous solution.

8. The process of claim 6 wherein the aqueous solution is treated with the polymeric amine prior to the extraction step.

9. The process of claim 8 wherein the treated aqueous solution is agitated to thereby reduce the size of the flocs produced therein.

10. The process of claim 9 wherein the aqueous solution is treated with 0.1–5% by weight of polymeric amine based upon the total weight of solids present in the aqueous solution.

11. In a process for the solvent extraction of metal values from their aqueous solutions wherein the aqueous solution is contacted during the solvent extraction step with a neutral to basic organic water immiscible solvent extractant for the metal values to thereby obtain a metal loaded extractant, the aqueous solution containing suspended slimes which detrimentally affect the extraction process, the improvement comprising treating the aqueous solution with effective quantities of a polymeric ammonium compound of hydrophilic character having a molecular weight of at least 5,000 and less than that molecular weight represented by incipient insolubility in a dilute acid containing multivalent anions to render the slimes hydrophilic in nature and inhibit emulsion formation.

12. The process of claim 11 wherein the aqueous solution is treated with 0.1–5% by weight of polymeric ammonium compound based upon the total weight of solids present in the aqueous solution.

13. The process of claim 11 wherein the aqueous solution is treated with the polymeric ammonium compound prior to the extraction step.

14. The process of claim 13 wherein the treated aqueous solution is agitated to thereby reduce the size of the flocs produced therein.

15. The process of claim 14 wherein the aqueous solution is treated with 0.1–5% by weight of polymeric ammonium compound based upon the total weight of solids present in the aqueous solution.

16. In a process for the solvent extraction of metal values from their aqueous solutions wherein the aqueous solution is contacted during the solvent extraction step with a neutral to basic water immiscible organic solvent extractant for the metal values to thereby obtain a metal loaded extractant, the aqueous solution containing suspended slimes which detrimentally affect the extraction process, the improvement comprising treating the aqueous solution with effective quantities of poly 2-vinyl pyridine metho-p-toluene sulfonate of hydrophilic character having a molecular weight of at least 5,000 and less than that molecular weight represented by incipient insolubility in a dilute acid containing multivalent anions to render the slimes hydrophilic in nature and inhibit emulsion formation.

17. In a process for the solvent extraction of metal values from their aqueous solutions wherein the aqueous solution is contacted during the solvent extraction step with a neutral to basic water immiscible organic solvent extractant for the metal values to thereby obtain a metal loaded extractant, the aqueous solution containing suspended slimes which detrimentally affect the extraction process, the improvement comprising treating the aqueous solution with effective quantities of poly 2-methyl 5-vinyl pyridine of hydrophilic character having a molecular weight of at least 5,000 and less than that molecular weight represented by incipient insolubility in a dilute acid containing multivalent anions to render the slimes hydrophilic in nature and inhibit emulsion formation.

18. In a process for the solvent extraction of metal values from their aqueous solutions wherein the aqueous solution is contacted during the solvent extraction step with a neutral to basic organic water immiscible solvent extractant for the metal values to thereby obtain a metal loaded extractant, the aqueous solution containing suspended slimes which detrimentally affect the extraction process, the improvement comprising treating the aqueous solution with effective quantities of poly 2-vinyl quinoline of hydrophilic character having a molecular weight of at least 5,000 and less than that molecular weight represented by incipient insolubility in a dilute acid containing multivalent anions to render the slimes hydrophylic in nature and inhibit emulsion formation.

19. In a process for the solvent extraction of metal values from their aqueous solutions wherein the aqueous solution is contacted during the solvent extraction step with a neutral to basic organic water immiscible solvent extractant for the metal values to thereby obtain a metal loaded extractant, the aqueous solution containing suspended slimes which detrimentally affect the extraction process, the improvement comprising treating the aqueous solution with effective quantities of poly dimethylamino ethylmethacrylate of hydrophilic character having a molecular weight of at least 5,000 and less than that molecular weight represented by incipient insolubility in a dilute acid containing multivalent anions to render the slimes hydrophilic in nature and inhibit emulsion formation.

20. In a process for the solvent extraction of metal values from their aqueous solutions wherein the aqueous solution is contacted during the solvent extraction step with a neutral to basic organic water immiscible solvent extractant for the metal values to thereby obtain a metal loaded extractant, the aqueous solution containing suspended slimes which detrimentally affect the extraction process, the improvement comprising treating the aqueous solution with effective quantities of poly 4-vinyl pyridine of hydrophilic character having a molecular weight of at least 5,000 and less than that molecular weight represented by incipient insolubility in a dilute acid containing multivalent anions to render the slimes hydrophilic in nature and inhibit emulsion formation.

References Cited in the file of this patent

UNITED STATES PATENTS

| | | |
|---|---|---|
| 2,634,280 | Tribalat et al. | Apr. 7, 1953 |
| 2,732,350 | Clarke | Jan. 24, 1956 |
| 2,740,522 | Aimone et al. | Apr. 3, 1956 |
| 2,817,645 | Weisguber | Dec. 24, 1957 |

FOREIGN PATENTS

| | | |
|---|---|---|
| 154,799 | Australia | Jan. 19, 1954 |